J. I. ARBOGAST.
GLASS BATCH GATHERER.
APPLICATION FILED JULY 16, 1910.
1,000,224.
Patented Aug. 8, 1911.
2 SHEETS—SHEET 2.
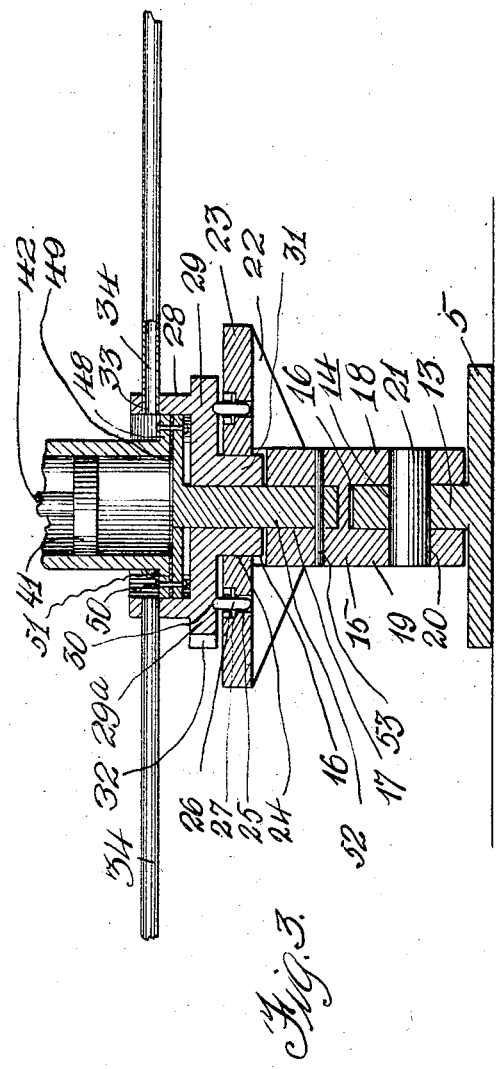
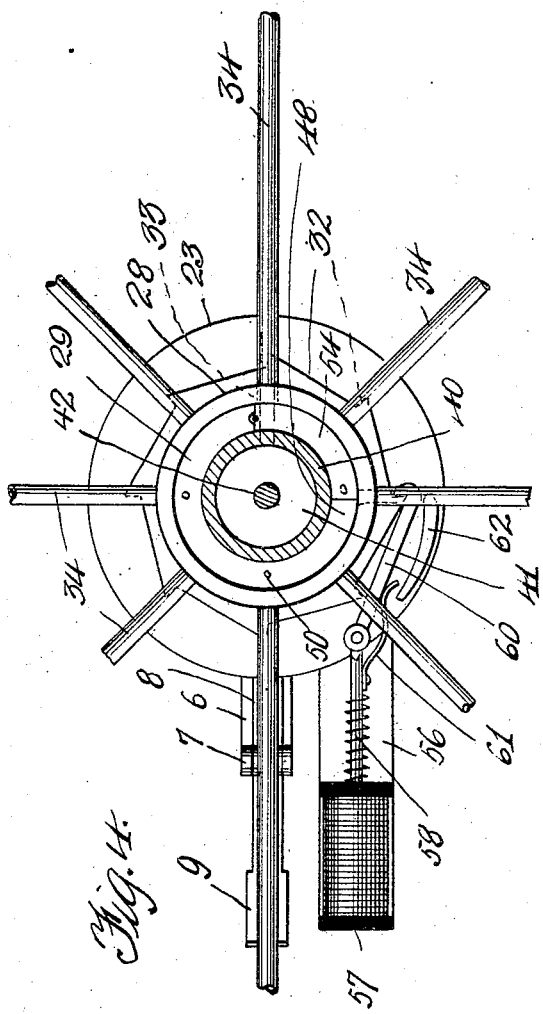
WITNESSES
INVENTOR
J. I. Arbogast,

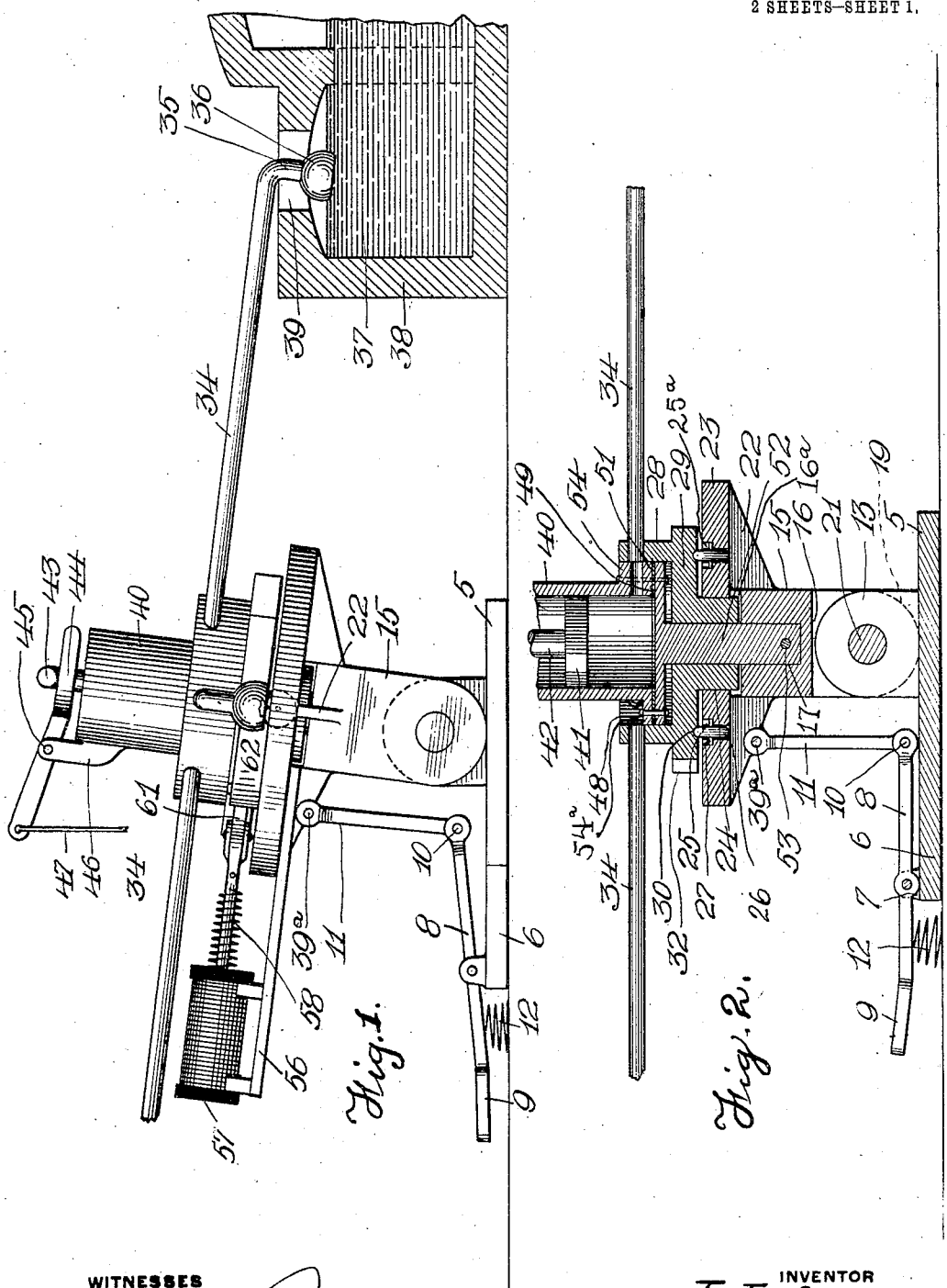

UNITED STATES PATENT OFFICE.

JOHN I. ARBOGAST, OF PITTSBURG, PENNSYLVANIA.

GLASS-BATCH GATHERER.

1,000,224.   Specification of Letters Patent.   Patented Aug. 8, 1911.

Application filed July 16, 1910. Serial No. 572,257.

*To all whom it may concern:*

Be it known that I, JOHN I. ARBOGAST, a citizen of the United States of America, residing at S. S. Pittsburg, in the county of Allegheny and State of Pennsylvania, have invented certain new and useful Improvements in Glass-Batch Gatherers, of which the following is a specification, reference being had therein to the accompanying drawing.

This invention relates to a glass batch gatherer and has for its object to provide a gatherer in a manner as hereinafter referred to for gathering a batch of glass from a body of molten glass and which is capable of being shifted after the batch is gathered for transferring the batch to a mold.

A further object of the invention is to provide a glass batch gatherer having as elements thereof means whereby a batch of glass is gathered by suction into a suction head and discharged from the head into a mold through the medium of a fluid pressure.

A further object of the invention is to provide a glass batch gatherer provided with a plurality of suction heads for gathering batches of glass and further provided with means whereby the device is intermittently rotated and tilted for successively bringing a suction head in position with respect to a body of molten glass so a batch can be gathered.

Further objects of the invention are to provide a glass batch gathering device which is comparatively simple in its construction and arrangement, strong, durable, efficient and convenient in its use, readily set up in operative position with respect to a body of molten glass so that the glass can be successively gathered in batches, and comparatively inexpensive to manufacture.

With the foregoing and other objects in view, the invention consists in the novel construction, combination and arrangement of parts as hereinafter more specifically described and illustrated in the accompanying drawings, wherein is shown one embodiment of the invention, but it is to be understood that changes, variations and modifications can be resorted to which come within the scope of the claims hereunto appended.

In the drawings wherein like reference characters denote corresponding parts throughout the several views: Figure 1 is a side elevation of a glass batch gathering device in accordance with this invention showing the adaptation therewith in connection with a glass pot or tank, the latter being illustrated in section and broken away, Fig. 2 is a vertical sectional view of the device partly broken away, Fig. 3 is a vertical sectional view at right angles to that shown in Fig. 2 and also partly broken away, and Fig. 4 is a sectional plan partly broken away.

In the drawings, 5 denotes a base plate formed with a pair of laterally-extending arms 6 having lateral lugs 7 to which is pivotally connected a foot operated lever 8 provided in its outer end with a foot tread 9 and at its inner end pivotally connected as at 10 to a vertically-disposed link 11. Interposed between the lever 8 and the support or foundation for the base plate 5 is a compression spring 12, the function of which is to normally maintain the lever 8 in an elevated position. The base plate 5 is formed with a vertically-disposed upright 13 having a centrally-disposed opening 14. The reference character 15 denotes a pedestal which has its lower portion bifurcated, as at 16 and its upper portion formed with a recess 16ª and a socket 17. The arms 18, 19 formed by the bifurcation 16 are arranged in parallelism with respect to the upright 13 and each of said arms 18, 19 is formed with an opening 20 which alines with the opening 14. Extending through the alining openings 14, 20 is a pin 21 for pivotally connecting the pedestal to the upright 13. The arms 18, 19 each has its lower terminus positioned at a point removed from the upper face of the plate 5 so that when the pedestal is tilted sufficient clearance will be had for tilting, as clearly shown in Fig. 1.

Mounted upon and connected to the pedestal 15 by the laterally-extending webs 22 is a platform 23 provided centrally with an opening 24 which communicates with the recess 16ª. The platform 23 at diametrically opposite points is provided with stepped openings 25, 25ª in each of which is arranged a friction roller 26 of a diameter to project above the upper face of the platform 23.

The journals for the rollers 26 are indicated by the reference character 27 and which are mounted upon the shoulders formed by the walls of the stepped openings 25.

Arranged over the platform 23 and mounted upon the rollers 26 is a revoluble cup-shaped carrier consisting of an annular body portion 28 open at its top and having its lower end formed integral with a bottom plate 29 which has its lower face provided with an annular groove 30 in which extends the rollers 26. Depending from the bottom plate 29 is a sleeve 31 which extends through the opening 24 and into the recess $16^a$ and maintains the cup-shaped carrier in operative position with respect to the platform 23. The bottom plate 29 is of greater diameter than the body portion 28 whereby a flange $29^a$ is provided which is cut away to form ratchet teeth 32, which are engaged by a means which will be referred to hereinafter for intermittently shifting the cup-shaped carrier. The bottom plate 29 of the carrier is of less diameter than the diameter of the platform 23.

The body portion 28 of the carrier at diametrically opposite points is formed with a series of openings 33, as shown eight in number and fixedly secured in each of the openings 33 and flushed with the inner face of the body portion 28 is a laterally-extending suction pipe or tube 34 having an angularly-disposed free end 35 to which is attached a suction head 36. The suction heads 36 are adapted to gather predetermined quantities of molten glass or a batch of glass, when dipped in the body of molten glass. As shown in Fig. 1 a suction head 36 extends into a body of molten glass 37 contained in a pot or tank 38; the angular end 35 of the suction pipe or tube 34 is shown as extending through an opening 39 formed in the top of the pot or tank 38. When the suction head is gathering a batch of glass, the pedestal 15 is tilted upon its pivot and toward the pot or tank 38. The tilting of the pedestal 15 is had by the operator pressing down upon the foot tread 9 which elevates the inner end of the lever 8 and vertically moves the link 11. The link 11 is pivotally connected as at $39^a$ to one of the webs 22, as clearly shown in Figs. 1 and 2. When pressure is removed from the tread 9 the spring 12 elevates the outer end of the lever 8 and restores the pedestal 15 to normal position which is as shown in Fig. 2.

Arranged within the carrier is a cylinder 40 having a piston 41 provided with a piston rod 42 having its outer end formed with a yoke 43, which is engaged by a lever 44 pivoted as at 45 to a supporting arm 46 which projects above the cylinder 40. The outer end of the lever 44 has a depending handle 47 attached thereto which when pulled on will elevate the inner end of the lever 44 and the latter engaging with the yoke 43 will elevate the piston 41 thereby creating suction within the cylinder 40 and pipe 34. When the lever 44 is shifted in the opposite direction the piston 41 will be lowered in the cylinder 40 and the batch of glass which has been gathered in the suction head 36 on the suction stroke of the piston will be expelled from said head. The inner end of the cylinder 40 is flanged as at 48 and mounted against the flanged end of the cylinder 40 is a closure disk 49 fixedly secured in position by the hold fast devices 50 which extend through the flange 48 and the plate 49. Interposed between the flanged end of the cylinder 40 and the plate 49 is a washer 51 forming an air tight connection at the inner end of the cylinder. Depending from the plate 49 and extending through the sleeve 31 and into the socket 17 is an arm 52 which is fixedly secured to the upper portion of the pedestal 15 by the transversely-extending hold fast device 53. The flange 48 as well as the plate 49 is of such diameter as to snugly engage the inner face of the body portion 28 of the revoluble carrier, but the engagement is such as not to prevent the shifting of the carrier around the flange 48 and plate 49 and upon the rollers 26. The inner ends of each of the suction pipes or tubes 34 is positioned in a plane above the flange 48 and each inner end of a suction pipe or tube 34 is adapted to register with an opening 54 at one end of the segment-shaped extension $54^a$ formed integral with the inner portion of the cylinder 40, and which snugly engages the inner face of the annular body portion 28, but the engagement is such as not to prevent the shifting of the carrier when occasion so requires.

Projecting laterally from one of the webs 22 is a support 56 carrying a solenoid 57 provided with a spring controlled core 58 which has pivotally connected to its outer end as at 59 a hook shaped dog 60 which engages with the teeth 32 for shifting the carrier upon the rollers 26 when the solenoid 57 is energized. The core 58 carries a leaf spring 61 having its free end engaging the dog 60 for holding the latter in engagement with the toothed flange $29^a$. The dog 60 is arranged over the platform 23 and is interposed between the toothed flange 29 of the carrier and a keeper 62 which is formed on the upper face of the platform 23. The solenoid 56 is utilized to intermittently rotate the carrier one-quarter turn when four suction pipes or tubes 34 are employed, if three be employed, the carrier is intermittently shifted by the solenoid a third revolution, if a pair of pipes or tubes be employed, the carrier is shifted by the solenoid intermittently a half revolution.

The piston 41 can be operated by any suitable source of power, but preferably the piston is operated through the medium of the manually actuated lever 44. The piston 41, lever 44, and cylinder 40 constitute what may be termend an exhaust or vacuum pump adapted to create a suction in the heads 36 when the piston 41 is elevated.

The heads 36 are lowered into the pot or tank 38 through the medium of the foot operated lever 8, which when actuated by foot pressure, tilts the pedestal 15 whereby the head 36 is shifted into the tank so as to gather the batch of glass when the piston 41 is elevated. When pressure is removed from the lever 8, the spring 12 returns the pedestal 15 to normal position and elevates the head 36 clear of the pot or tank 38, so that that head carrying the batch of glass can be shifted clear of the tank and to a mold so that when the inner end of the tube passes clear of the segment-shaped extension 45 the vacuum in the tube will be destroyed and the glass dropped from the head into the mold (not shown). As long as the inner end of the suction tube is traveling against the extension 54ª, the vacuum will be maintained in the tube, but the moment that the tube passes clear of the extension, the vacuum will be destroyed and the batch dropped.

What I claim is:—

1. A glass batch gathering device comprising a tiltable support, means for tilting said support and returning it to normal position, a revoluble carrier, suction tubes carried thereby, a head connected to each tube, a stationary cylinder extending in the carrier and fixed to said tiltable support and provided with a segment-shaped extension formed with an opening constituting a combined inlet and outlet and adapted to successively register with the tubes, means operating in the cylinder for creating a vacuum in the tubes when they successively register with the said combined inlet and outlet thereby drawing a batch of glass in the head, and said extension constituting means for temporarily maintaining the vacuum in the tube until the tube clears the extension when the vacuum is broken and the batch dropped from the head.

2. A glass batch gathering device comprising a tiltable support, means for tilting said support and returning it to normal position, a revoluble carrier, suction tubes carried thereby, a head connected to each tube, a stationary cylinder extending in the carrier and fixed to said tiltable support and provided with a segment-shaped extension formed with an opening constituting a combined inlet and outlet and adapted to successively register with the tubes, means operating in the cylinder for creating a vacuum in the tubes when they successively register with the said combined inlet and outlet thereby drawing a batch of glass in the head, said extension constituting means for temporarily maintaining the vacuum in the tube until the tube clears the extension when the vacuum is broken and the batch dropped from the head, and means engaging with the carrier for intermittently revolving it.

3. A glass batch gathering device comprising a tiltable support, means for tilting said support and returning it to normal position, a revoluble carrier, suction tubes carried thereby, a head connected to each tube, a stationary cylinder extending in the carrier and fixed to said tiltable support and provided with a segment-shaped extension formed with an opening constituting a combined inlet and outlet and adapted to successively register with the tubes, means operating in the cylinder for creating a vacuum in the tubes when they successively register with the said combined inlet and outlet thereby drawing a batch of glass in the head, said extension constituting means for temporarily maintaining the vacuum in the tube until the tube clears the extension when the vacuum is broken and the batch dropped from the head, means engaging with the carrier for intermittently revolving it, and friction rollers carried by said tiltable support and engaging said carrier.

In testimony whereof I affix my signature in the presence of two witnesses.

JOHN I. ARBOGAST.

Witnesses:
MAX H. SROLOVITZ,
K. H. BUTLER.